United States Patent

[11] 3,556,012

| [72] | Inventor | Bert B. Parshall |
| | | Wood Dale, Ill. |
| [21] | Appl. No. | 826,110 |
| [22] | Filed | May 20, 1969 |
| [45] | Patented | Jan. 19, 1971 |
| [73] | Assignee | FMC Corporation |
| | | San Jose, Calif. |
| | | a corporation of Delaware |

[54] MAGNETIC PROBE FOR TOW TRUCKS
4 Claims, 4 Drawing Figs.

[52] U.S. Cl. .......................................... 104/88,
104/172, 61/44, 335/205
[51] Int. Cl. ......................................... B61j 3/00
[50] Field of Search ............................. 200/61.44;
335/205; 200/61.41, 61.42, 61.43; 104/172;
104/88

[56] References Cited
UNITED STATES PATENTS
3,078,810 2/1963 Bradt et al. .................... 104/172

3,094,944 6/1963 Bradt et al. .................... 104/172
3,373,698 3/1968 Bishop ........................... 104/88
2,816,516 12/1957 Diehl ............................. 104/88

*Primary Examiner*—Robert K. Schaefer
*Assistant Examiner*—M. Ginsburg
*Attorneys*—F. W. Anderson and C. E. Tripp ABSTRACT: A magnetic switch actuating apparatus for use in a tow truck system includes two horizontal probe mounting members disposed on either side of the tow pin of a truck at the front end of the truck. A series of vertical apertures through the mounting members are provided to receive the switch actuating probes which consist of a double shouldered handle portion secured to the upper end of a magnet supporting spring. The magnet which is disposed proximate the surface of the floor serves to actuate a magnetically responsive reed switch beneath the floor to open a diverting switch and divert the truck from a main slot of the tow truck system to a preselected shunt slot. Smaller diameter holes in the probe supporting members provide elevated inoperative positions for the probes when not in use.

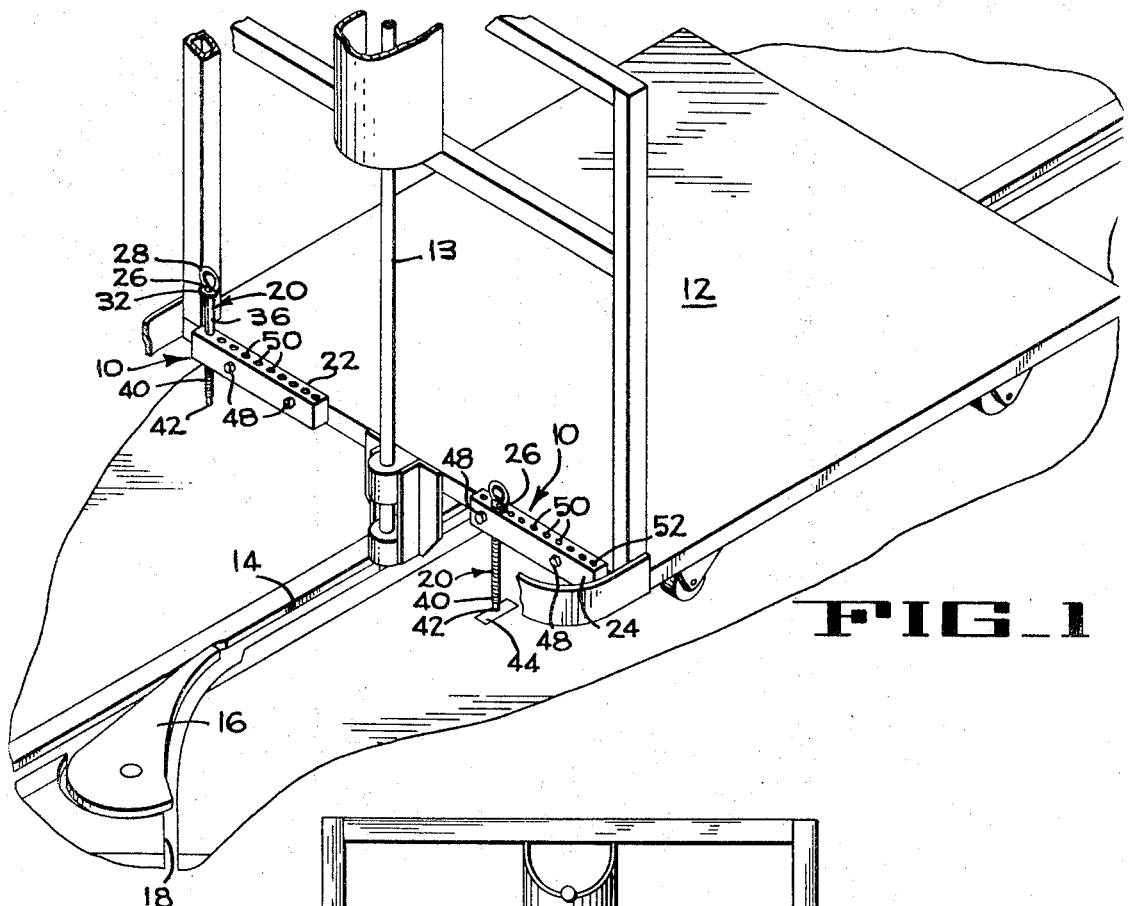
FIG_1
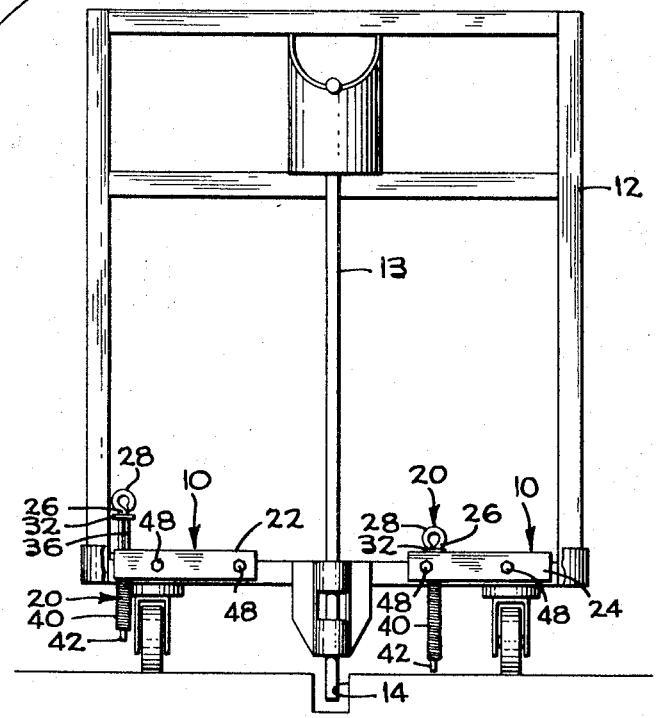
FIG_2
INVENTOR.
BERT B. PARSHALL
BY F.W. Anderson
C. E. Tripp
ATTORNEYS PATENTED JAN 19 1971
3,556,012
SHEET 2 OF 2
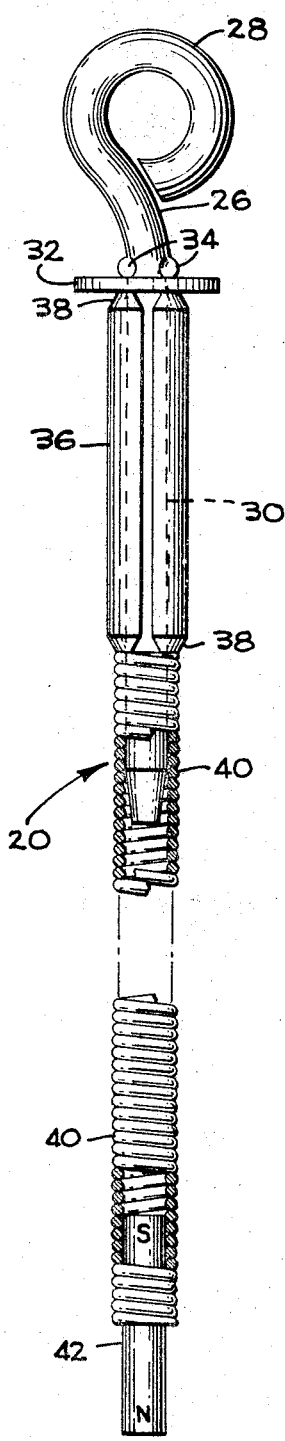
FIG_3
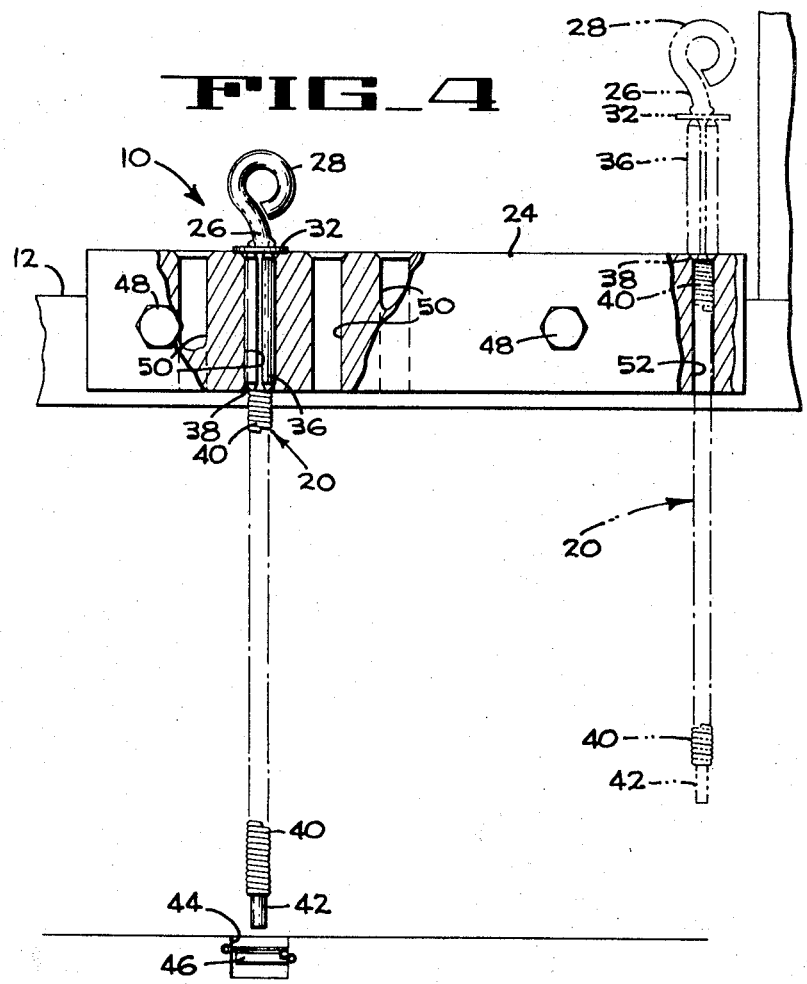
FIG_4
INVENTOR.
BERT B. PARSHALL
BY J. W. Anderson
C. E. Tripp
ATTORNEYS

MAGNETIC PROBE FOR TOW TRUCKS

BACKGROUND OF THE INVENTION

1. Field of the Invention

The present invention relates generally to automated tow truck systems wherein trucks or dollies are towed by a driven linked chain along an endless main slot in a reference surface such as the floor of a warehouse. Switches disposed at preselected intervals along the main slot serve to divert the trucks into adjacent shunt slots when activated by a probe or probes on the truck. The switches can be of the mechanically-actuatable type or of the electrically-actuatable type. The present invention is concerned with the latter type wherein a magnet-carrying probe mounted on the truck actuates a metallic reed switch beneath the floor to close an electrical circuit and open a switch plate in the floor so as to divert the truck into the adjacent shunt slot.

Due to obstructions on the floor, means have to be provided to prevent damage to the probes when contacting such obstructions. The usual means is to make the upper portions of the probe out of metal and the lower portion of a flexible plastic or rubber. If the plastic or rubber portion is long enough to prevent obstructions from contacting the metal portion of the probe, the plastic or rubber will not maintain the precise and critical location of the magnet after having been deflected several times. In order to maintain the precise location of the magnet the plastic or rubber portion of the probe has to be made shorter and the upper metal portion longer. However, with this arrangement a moderate height obstruction will contact, bend, and consequently damage the probe.

Another prevalent and undesirable feature of conventional switch actuating devices is their inability to permit the removal of the probe from its operative, damage-susceptible position after the truck is diverted from the main slot, and this defect increases the possibility of damage to the probe.

2. Description of the Prior Art

The closest prior art to the present invention is U.S. Pat. No. 2,816,516 issued to W.J. Diehl on Dec. 17, 1957. The Diehl patent discloses a switch actuating mechanism for a tow truck system wherein a switch operating device is slidably mounted on a notched selector bar so that it can be moved to different stations across the width of the truck. The switch operating device includes a slidable handle-bracket member surrounding the notched selector bar so that a horizontal detent pin attached to the bracket can removably rest in the said notches. A spring depending from the bracket supports a metallic roller on its lower end which attracts a crescent-shaped permanent magnet disposed beneath the floor to actuate the switch and divert the truck from the main slot of the tow truck system into an adjacent shunt slot. A shallow notch on the selector bar provides means for placing the switch operating device in an inoperative position so that the metallic roller is high enough off the floor to avoid the magnetic field of a permanent magnet under the floor. It is noted, however, that the switch operating device cannot easily be removed from the truck and even in its neutral inoperative position it can be struck by obstructions on the floor because the shallow notch does not elevate the device a sufficient distance to avoid even moderate height obstructions.

Other prior art devices are disclosed in U.S. Pats. 3,174,439 and 3,338,178 issued to D.M. Edgar et al. and R.P. Jones respectively.

SUMMARY OF THE INVENTION

The tow truck switch actuating apparatus of the present invention comprises a new spring type magnetic probe and novel mounting means for the probe.

The probe itself includes a handle having a looped head and an elongated body extending therefrom. A washer member surrounds the elongated body of the handle near its looped head and is supported from below by a roll pin, having conically beveled ends, which snugly fits the elongated body of the handle along most of its length.

A strong but flexible spring, having a smaller diameter than the roll pin, has its upper end bonded to a lower end portion of the handle and supports a permanent magnet at its lower end. The overall length of the probe is such that when it is mounted on the tow truck in its operative position, the lowermost end of the magnet is only slightly spaced from the floor.

The mounting means for the probes consists of two horizontal brackets secured to the tow truck on either side of the truck's tow pin. Each of the brackets has a plurality of vertical apertures therethrough for receiving and supporting the probes. The majority of the apertures have a diameter slightly larger than the roll pin yet smaller than the outside diameter of the washer so that the probe can be placed into the aperture and be supported by the washer. The remaining apertures have a diameter slightly smaller than the roll pin but larger than the diameter of the spring so that the spring will fit into the aperture and the probe will be supported by the lower beveled end of the roll pin. In the smaller diameter apertures, the probe is thus supported in an elevated position so that the magnet cannot actuate a switch passing thereunder and it is high enough off the floor so that common obstructions on the floor are not hazards and need not be avoided to prevent possible damage to the probe.

The resiliency of the spring also helps to prevent damage to the probe even in its lowered operative position in that it has the capability to yield laterally if contacted by an obstruction. The spring also has the inherent capacity to return to its identical precontact position after being deflected out of this position so that it is not necessary to replace the spring or probe after several of such deflections.

Accordingly, it is an object of the present invention to provide a switch actuating apparatus that is substantially damage-free.

Another object is to provide a probe for a magnetically actuated switch which is resilient and yet which will always return to its original position after deflection.

Another object is to provide a magnetically operable switch system wherein the actuating probe carries a permanent magnet.

Another object is to provide a switch actuating apparatus wherein the probes can be completely removed from the apparatus or placed in an inoperative position in the apparatus where they cannot be damaged by obstructions on the floor.

Still another object is to provide a switching system wherein a magnet carrying probe on a tow truck serves to actuate a reed switch disposed beneath the floor.

The manner in which these and other objects of the invention may be obtained will be apparent from the following detailed description and the accompanying drawings.

BRIEF DESCRIPTION OF THE DRAWINGS

FIG. 1 is a fragmentary isometric view of a tow truck having the switch actuating apparatus of the present invention mounted across the front thereof.

FIG. 2 is an end elevational view of the tow truck with the switch actuating apparatus of the present invention mounted thereon.

FIG. 3 is an enlarged elevational view of the probe of the switch actuating apparatus.

FIG. 4 is an enlarged fragmentary view with part taken away of the switch actuating apparatus; included also is a reed switch embedded in the floor to cooperate with the magnet disposed on the end of the probe.

DESCRIPTION OF THE PREFERRED EMBODIMENT

The switch actuating apparatus of the present invention, generally designated 10, is adapted for use on a truck 12 utilized in a tow truck system wherein trucks are towed by a driven link chain, that is arranged to be removably engaged with the tow pin 13 of the truck, along an endless main slot 14 in a reference surface such as the floor of a warehouse. Electrically-responsive floor switches 16, disposed at preselected intervals along the main slot 14, divert the trucks 12 into adjacent shunt slots 18 when actuated by the magnet-carrying probe of the present invention, generally designated 20. The magnet-carrying probe 20 depends from the front end of the truck and cooperates with a magnetically responsive reed switch to open the diverting switch 16.

The switch actuating apparatus consists of at least one actuating probe 20 and a pair of mounting brackets 22 and 24.

The actuating probe includes a handle portion consisting of a metal pin 26 having a looped head 28 and elongated body 30 as shown in FIG. 3. A washer 32, having an inner circular opening substantially identical in size and shape to the cross-sectional area of the pin 26, is received on the pin and held in place on the elongated body of the pin near the looped head 28 to serve as one of two supporting shoulders on the probe. A pair of pinched ears 34 at the top of the elongated body 30 prevent the washer from upward movement on the pin and a roll pin 36 supports the washer from below to prevent downward movement.

The roll pin 36 is conventional and snugly fits around the pin 26 along a substantial portion of the pin's elongated body 30. The roll pin 36 has conically beveled ends 38, the lowermost of which serves as a second support shoulder for the probe, utilized when the probe is retained in its inoperative position, as will be explained later.

Suitably retained on the lower end of the pin 26, immediately below and in abutting relationship with the roll pin, is a tightly wound helical coil extension spring 40 with high initial tension approximately 9¾ inches in length. A permanent magnet 42 enclosed in a nonmagnetic sleeve is bonded to the internal surface of the extension spring at its lowermost end. The bonding medium is preferably epoxy resin but any suitable adhesive could be used as long as it is reliably durable.

The overall length of the actuating probe 20 is approximately 14 inches so that when it is mounted on the front of a truck 12 in its operative position, the lower end of the magnet 42 will be spaced approximately three-eighths of an inch from the floor so that the magnetic field of the magnet 42 will extend beyond the surface of the floor. It is important to note that the lower 8½ inches of the probe is entirely flexible so that even obstructions that are approximately 7 inches high will not damage the probe.

Embedded in a nonmagnetic aluminum box 44 in the floor is a minute reed switch 46. The reed switch 46 consists of a pair of contacts housed in a glass capsule with leads passing to the floor switch 16 of the tow truck system and to an electrical power source (not shown) so that when a probe in its operative position passes immediately over the switch, the magnet 42 on the probe will draw the contacts of the reed switch together closing a circuit to actuate the floor switch 16. The reed switch 46 is conventional and very small in size so that the magnetic field of the adjacent probe, not intended to actuate the switch, will not reach the minute reed switch.

The mounting brackets 22 and 24 as seen in FIGS. 1 and 2 are mounted on either side of the tow pin 13. They are fixedly secured to the truck frame by bolts 48.

Each of the brackets 22 and 24 has a series of vertical, circular apertures 50 and at least one vertical, circular aperture of reduced diameter 52 defining operable and inoperable probe stations, respectively. Each of the larger apertures 50 has a diameter slightly larger than the outside diameter of the roll pin 36 but smaller than the outside diameter of the washer 32 so that the probe 20 will easily fit into an aperture 50 and rest with the washer 32 abutting against the upper surface of the bracket 22 or 24. Also, the apertures 50 have countersunk upper ends to serve as guides when inserting the probe therein to facilitate quick and efficient manipulation of the probes. Thus disposed, the probe is in its operative position and the magnet 42 is slightly elevated from the floor a distance such that its magnetic field extends into the floor where it can magnetically actuate the reed switch 46 embedded therein.

The smaller diameter apertures 52 have a diameter that is slightly larger than the coil spring 40 but smaller than the roll pin 36 so that, when the probe is inserted into one of these apertures, as shown in phantom lines in in FIG. 4, the lower beveled end of the roll pin will prevent the probe from dropping down into its operative position and instead will maintain the probe in an elevated inoperative position. In the probe's inoperative position, the magnetic field of the magnet 42 does not extend beyond the floor surface and thus the reed switch 46 cannot be actuated by the probe in such a position. Also, the entire probe is elevated off the floor enough so that common floor obstructions cannot contact and possibly damage the probe. To stabilize the probe in this elevated position the apertures 52 are countersunk at their upper end so as to mate with the conically beveled lower end 38 of the roll pins 36.

It is apparent that more than one probe could be placed in an operative position if the truck were being used in a system wherein simultaneous actuation of two or more reed switches was necessary to actuate the electrically responsive diverting switches. Such a system is frequently utilized where there are a greater number of shunt slots, and consequently diverting switches, than there are operable stations for actuating probes.

In operation, a truck 12 having the switching apparatus of the present invention attached to the front thereof, is towed along the main slot 14. If it is intended that the truck be diverted into a particular shunt slot 18, the probe 20 is placed in its operative position in an aperture 50 that is vertically aligned with the reed switch 46 associated with that particular shunt slot. It is noted that the reed switches 46 can be placed at varying lateral distances from the main slot 14 on either side thereof as long as they are placed so as to be vertically below an aperture 50 on a truck being towed along the main slot.

As the truck is towed over the reed switch associated with the particular shunt slot 18, the magnet 42 on the probe 20 will draw the contacts of the reed switch together to complete an electrical circuit through the diverting switch 16 thus opening the diverting switch causing the truck 12 to be directed into the shunt slot. A cam surface on the diverting switch closes the switch after the truck enters the shunt slot so as not to disturb the normal subsequent passage of trucks along the main slot. If it is desired to store the probe in a nonuse, out-of-the-way position, it is removed from the aperture 50 and inserted in the aperture 52.

Although the best mode contemplated for carrying out the present invention has been herein shown and described, it will be apparent that modification and variation may be made without departing from what is regarded to be the subject matter of the invention.

I claim:

1. A switch actuating apparatus for use on a truck in a tow truck system wherein diverting switches disposed in a reference surface are actuated by the said switch actuating apparatus to divert the truck from the main slot in said system to a shunt slot, said apparatus comprising in combination, at least one mounting bracket secured to said truck, said bracket having a plurality of identically sized vertical probe retaining apertures therethrough and at least one probe retaining aperture therethrough of smaller diameter than said identically sized apertures, a switch actuating probe mounted in said bracket and having two supporting shoulders, the lowermost of said shoulders having a diameter greater than the diameter of the smaller aperture but less than the diameter of the larger of said apertures and the uppermost of said shoulders having a diameter greater than the diameter of the larger of said apertures so that when said probe is retained in one of said identically sized apertures it will be supported by the uppermost shoulder and when said probe is retained in the smaller aperture it will be supported by the lowermost shoulder.

2. A switch actuating apparatus for use on a truck in a tow truck system wherein diverting switches disposed in a reference surface are actuated by the said switch actuating apparatus to divert the truck from the main slot in said system to a shunt slot comprising in combination, at least one switch actuating probe, and a mounting bracket having a plurality of identically sized probe retaining apertures therethrough for retaining said probe in a lowered operative position and at least one probe retaining aperture therethrough of smaller diameter than said identically sized apertures to retain said probe in a raised inoperative position, said probe having means whereby it is selectively retained in either the larger or the smaller aperture.

3. The apparatus of claim 1 wherein said probe is laterally resilient and has a permanent magnet affixed thereto and wherein said diverting switches are magnetically responsive.

4. The apparatus of claim 2 wherein said probe is laterally resilient and has a permanent magnet affixed thereto and wherein said diverting switches are magnetically responsive.